F. Y. MURAZEN.
FAN ATTACHMENT FOR CAMERAS.
APPLICATION FILED JULY 29, 1916.
1,277,461. Patented Sept. 3, 1918.
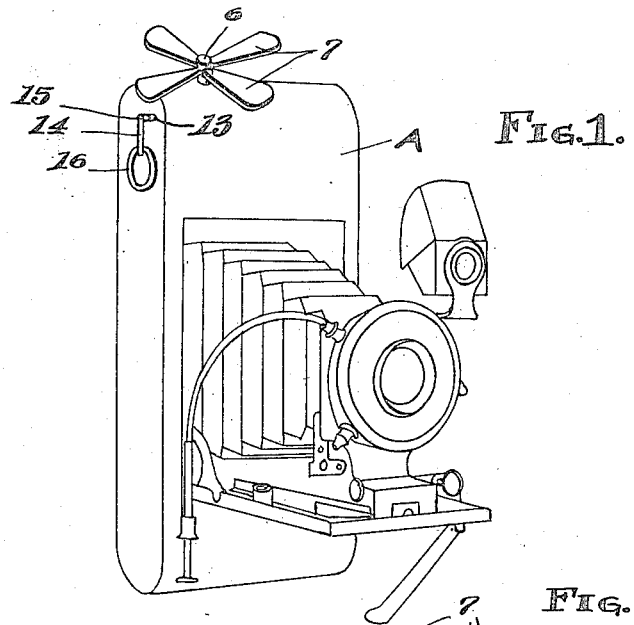
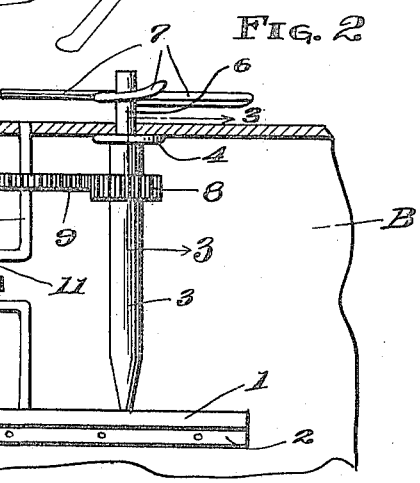
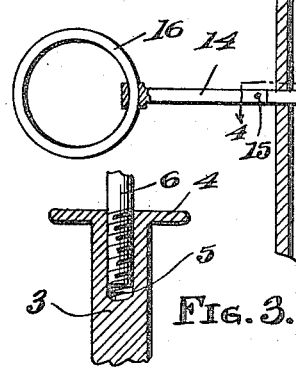
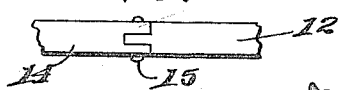
Witnesses.
R. Meyer
James J. Dougan
Inventor
F. Y. MURAZEN.
By
Randolph Jr.
Attorney

UNITED STATES PATENT OFFICE.

FRANK Y. MURAZEN, OF DUBOIS, IDAHO.

FAN ATTACHMENT FOR CAMERAS.

1,277,461.  Specification of Letters Patent.  Patented Sept. 3, 1918.

Application filed July 29, 1916. Serial No. 112,186.

*To all whom it may concern:*

Be it known that I, FRANK Y. MURAZEN, a subject of the Emperor of Japan, residing at Dubois, in the county of Fremont and State of Idaho, have invented certain new and useful Improvements in Fan Attachments for Cameras; and I do hereby declare the following to be a full, clear, and exact description of the invention, such as will enable others skilled in the art to which it appertains to make and use the same.

The object of this invention is to associate with a camera, an attachment in the nature of a mechanically operated fan, and without in any way modifying the construction of the camera, other than making the camera casing or housing slightly longer, to admit of the operating mechanism for the fan being concealed within one end of the casing and not interfere with the working parts of the camera.

Another object of the invention is the provision of an attachment of this nature, that will be of simple, durable construction, efficient in operation, and can be conveniently associated with the camera and will admit of the fan shaft being disengaged from the operating mechanism, when desired, and carried in a pocket or other receptacle.

Other objects will appear and be better understood from that embodiment of my invention, of which the following is a specification, reference being had to the accompanying drawing, forming a part thereof, in which:

Figure 1 is a perspective view of a camera showing the attachment applied thereto.

Fig. 2 is a detail sectional view taken through the upper end of the camera, and showing the fan operating mechanism.

Fig. 3 is a detail sectional view taken on the line 3—3 of Fig. 2.

Fig. 4 is a detail view of one of the parts.

Referring to the drawing in detail, the letter A designates a camera, of ordinary construction, but in this instance having the casing or housing thereof made slightly longer so as to provide at the upper end thereof a space B. Mounted within the upper end of the casing of the camera is a strip 1 that is angular in cross section and has connection with the rear wall of the camera by means of the element 2. Rotatably mounted within the upper end of the casing of the camera is a vertical shaft 3, the lower end of which is restricted and journaled in a bearing formed in the strip 1, and the upper end of the shaft 3 is provided with a collar 4 that engages the inner surface of the upper end wall of the camera. The shaft 3 has its upper end provided with a longitudinal socket 5 that threadedly receives the inner end of a shaft 6, the said shaft 6 being rotatably received by an opening formed in the upper end wall of the camera casing and has its upper end provided with a plurality of fan blades 7. A pinion 8 is mounted on the shaft 3, and rotates therewith, and is located adjacent the upper end of the shaft and meshes with a large pinion 9 carried by the upper end of the second vertical shaft 10, that is arranged in spaced relation with the shaft 3. The shaft 10 has its upper end journaled in an opening in the upper end wall of the camera casing, and its lower end journaled in a bearing in the transverse strip 1. The shaft 10 is provided at a point intermediate its ends with a crank portion 11, to which is connected one end of a horizontally reciprocating rod 12. The rod 12 has its opposite end extended through an elongated slot 13 formed in one of the adjacent side walls of the casing of the camera, and has the terminal of its outer end pivotally connected to a manipulating rod 14, by means of a pivot pin 15, the free end of the manipulating rod 14 being provided with a ring 16, adapted to accommodate one of the fingers of the hand.

In use, the ring 16 receives one of the fingers of the operator's hand, and the manipulating rod 14 is moved to horizontal position as shown in Fig. 2 of the drawing. Horizontal reciprocating movement is then imparted to the rod 14 and the rod 12, effecting rotation of the shaft 10, which in turn imparts rotation to the shaft 3, so as to rotate the fan shaft 6. When the fan is not in use, the fan shaft can be detached from the shaft 3, and the manipulating rod 14 folded into parallelism with the adjacent side of the camera casing, as shown in Fig. 1 of the drawing.

It is evident that various changes might be resorted to in the construction, form and arrangement of the several parts without departing from the spirit and scope of the invention, hence I do not wish to limit myself strictly to the structure herein described.

What I claim is:

The combination with a casing having a shaft journaled therein, said shaft provided with a threaded bore extending inwardly from one end thereof, of a second shaft adjustably connected to the first named shaft through the medium of said threaded bore, a plurality of fan blades carried by said second shaft, a crank shaft journaled within said casing, gears connecting said crank shaft and said first named shaft for rotating the first named shaft and second shaft by the rotation of the crank shaft, a rod connected to said crank shaft and projecting beyond one side of said casing, and a handle pivotally connected to said rod exteriorly of said casing for operating the rod to rotate said crank shaft.

In testimony whereof I affix my signature in presence of two witnesses.

FRANK Y. MURAZEN.

Witnesses:
C. N. FRIDAY,
ROY S. MATSUMURO.

Copies of this patent may be obtained for five cents each, by addressing the "Commissioner of Patents, Washington, D. C."